United States Patent [19]

Briggs et al.

[11] Patent Number: 5,046,038
[45] Date of Patent: Sep. 3, 1991

[54] METHOD AND APPARATUS FOR PERFORMING DIVISION USING A RECTANGULAR ASPECT RATIO MULTIPLIER

[75] Inventors: Willard B. Briggs, Carrollton; David W. Matula, Dallas, both of Tex.

[73] Assignee: Cyrix Corporation, Dallas, Tex.

[21] Appl. No.: 389,051

[22] Filed: Aug. 2, 1989

Related U.S. Application Data

[63] Continuation-in-part of Ser. No. 376,753, Jul. 7, 1989, abandoned.

[51] Int. Cl.$^5$ .............................................. G06F 7/52
[52] U.S. Cl. ............................................... 364/765
[58] Field of Search ........................ 364/765, 766, 767

[56] References Cited

U.S. PATENT DOCUMENTS

| | | | |
|---|---|---|---|
| 3,591,787 | 7/1971 | Freiman et al. | 364/767 |
| 3,828,175 | 8/1974 | Amdahl et al. | 364/765 |
| 4,466,077 | 8/1984 | Iannucci et al. | 364/766 |

Primary Examiner—David H. Malzahn
Attorney, Agent, or Firm—Baker & Botts

[57] ABSTRACT

A method and apparatus for performing division is described which first comprises approximating the short reciprocal of the divisor. A reciprocal bias adjustment factor is added to the approximation and the correctly biased short reciprocal is multiplied by a predetermined number of the most significant bits of the dividend and the product is truncated to generate a first quotient digit value. The multiplication takes place in a multiplier array having a rectangular aspect ratio with the long side having a number of bits at least as large as the number of bits required for the divisor. The short side of the multiplier array has a number of bits slightly greater by several guard bits than the number of bits required for a single quotient digit value, which is also determined to be the number of bits in the short reciprocal. The quotient digit value is multiplied by the full divisor and the exact product is subtracted from the dividend to yield an exact partial remainder. The described steps are repeated to serially generate quotient digit values with exact partial remainders with the preceding partial remainder taking the place of the dividend. The quotient digit values are accumulated to yield a complete quotient. The complete quotient is decremented and the remainder recalculated if the final partial remainder is negative, yielding the full precision unique quotient and non-negative remainder pair.

26 Claims, 2 Drawing Sheets

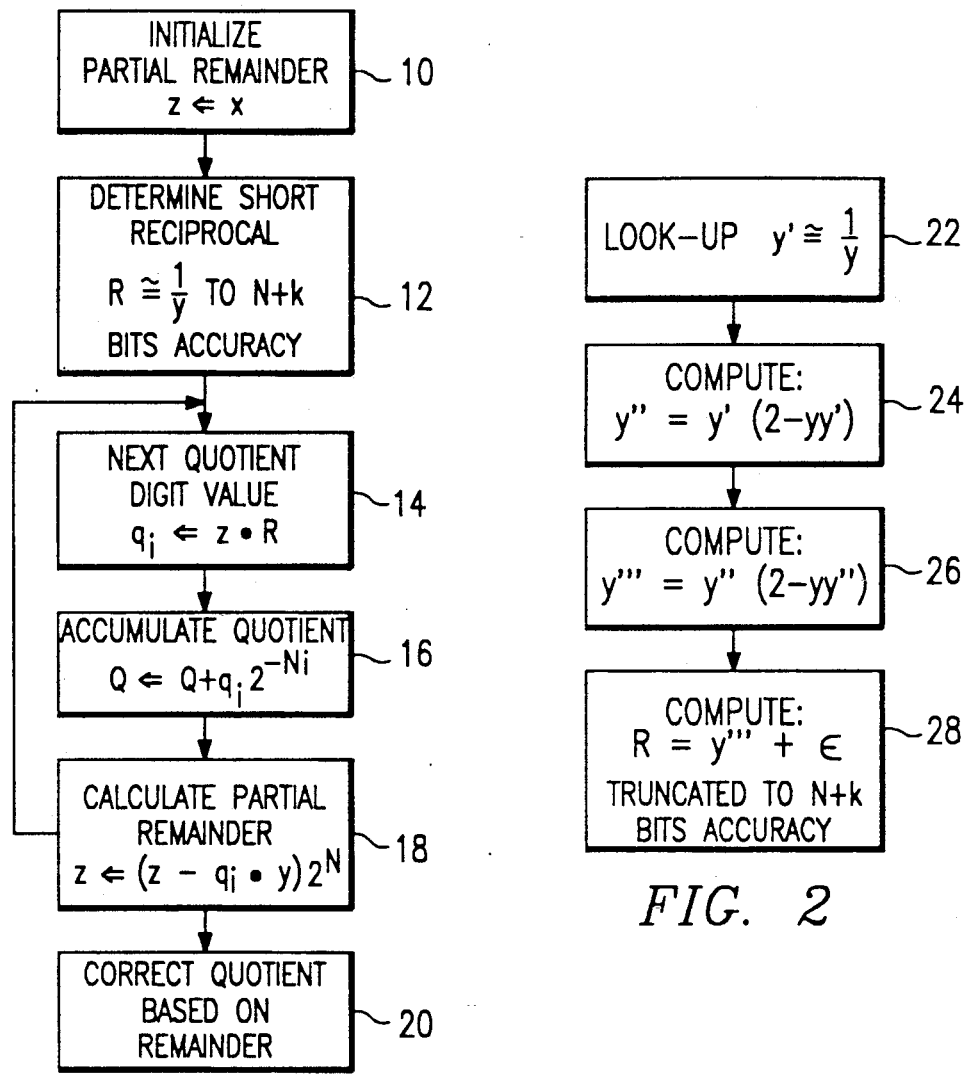

METHOD AND APPARATUS FOR PERFORMING DIVISION USING A RECTANGULAR ASPECT RATIO MULTIPLIER

RELATED APPLICATIONS

This application is a continuation-in-part of Applicants' co-pending U.S. patent application Ser. No. 07/376,753, filed July 7, 1989 entitled "Method and Apparatus for Performing Division Using a Rectangular Aspect Ratio Multiplier" now abandoned.

TECHNICAL FIELD OF THE INVENTION

This invention relates in general to the field of performing mathematical functions using electronic devices. More specifically, the present invention relates to a method and apparatus for performing the division function in a system using a rectangular aspect ratio multiplier circuit.

BACKGROUND OF THE INVENTION

The arithmetic unit is one of the most important components of any integrated electronic data processing system. Arithmetic units perform a wide variety of mathematical functions upon operands which are transmitted from other portions of an integrated system. The basic addition, subtraction and multiplication functions are quickly and efficiently performed in arithmetic units today. However, presently available techniques for performing division functions have not been completely satisfactory with respect to efficiency and speed.

A common method of performing division in arithmetic systems presently available is through the use of commonly known SRT procedures. In SRT division, the digits of the quotient are developed serially a certain number of bits at a time using table look-ups or programmable logic arrays (PLA) to logically determine each quotient digit as a function of the leading bits of the partial remainder and divisor. An exact new partial remainder is calculated after each digit so that the process may continue indefinitely. A key disadvantage of SRT division is that because of the limitations of the look-up table size, no more than three or four bits per quotient digit can be calculated in any one step. Thus, the division operation using the SRT system takes many steps or iterations. In effect the time required for SRT division grows linearly with the number of bits of precision, and becomes relatively slower in comparison to certain approximation techniques for higher precision division operations.

A more recently developed system employs a division system using a Newton-Raphson approximation technique. In this system, an approximation of the reciprocal of the divisor is calculated using an iterative process to achieve a value for the reciprocal in a full precision format. The full precision reciprocal approximation is then multiplied by the full precision dividend to achieve an estimate of the full precision quotient. Only a bound on the indeterminate error of the estimated quotient is known and this information is inadequate for implementation of precise rounding. To achieve precise rounding the indeterminacy in the error is removed by a second full precision multiplication. In the second full precision multiplication step, the divisor is multiplied by the estimated quotient and a corresponding remainder is computed. This information is then sufficient to allow for the appropriate IEEE standard rounding procedures. The Newton-Raphson division sequence is superior to the SRT division, but still contains a major disadvantage. The Newton-Raphson division requires two full precision multiplies which are time consuming. The Convergence Division Method, which is effectively a variation of the Newton-Raphson division process, requires similar steps to remove the indeterminacy in the error to effect IEEE standard roundings.

Therefore, a need has arisen for a system which uses a division process which results in an exact result which can be used for appropriate IEEE standard rounding procedures, but which is less time consuming than and more efficient than previously developed systems.

SUMMARY OF THE INVENTION

In accordance with the present invention, a division method and system are provided which substantially eliminate or reduce disadvantages and problems associated with prior arithmetic techniques used to perform the division function.

The division system of the present invention first determines an approximation of the reciprocal of the divisor, hereinafter referred to as the short reciprocal, accurate to a number of bits needed to substantially fill the smaller side of a rectangular aspect ratio multiplier (hereinafter sometimes also referred to as "rectangular multiplier") circuit. The division system then develops quotient digit values corresponding to a large radix. This large radix is substantially equal to the number of bits of the smaller side of the rectangular multiplier. The precision required for the short reciprocal is limited to one digit in this large radix plus appropriate guard bits. Importantly, the error in the short reciprocal can be left indeterminate as only a bound on the error of the reciprocal value is needed for the process, thus eliminating a time consuming feature of the Newtow-Raphson with IEEE standard rounding process. Each quotient digit value is determined by multiplying the short reciprocal of the divisor by the partial remainder in the rectangular multiplier and appropriately truncating the result. The quotient digit values are determined serially with exact partial remainders. Each quotient digit value determined by the technique is one of at most two possible values in the large radix system where the new partial remainder corresponds to less than a unit of value in the quotient digit determined. Such partial remainders are then sufficient for simplified implementation of all IEEE standard roundings. Through the use of a rectangular multiplier, no full precision multiplication steps are required.

An important technical advantage of the present invention inheres in the fact that it uses a rectangular aspect ratio multiplier circuit. The use of the rectangular multiplier saves time in several places in the division process. Each of the multiplication steps used to form the quotient digit values are much simpler functions than full precision multiplication. Further time savings result from the fact that the initial estimation of the reciprocal of the divisor need only be estimated to the precision of the shorter side of the rectangular multiplier. This saves the multiplication steps necessary in the Newton-Raphson iterations to expand the accuracy of the estimation to a full precision width, as well as saving the subsequent full precision multiplications employed to remove the indeterminacy in the Newton-Raphson quotient approximation.

BRIEF DESCRIPTION OF THE DRAWINGS

A more complete understanding of the present invention may be acquired by referring to the detailed description and claims when considered in connection with the accompanying drawings, wherein:

FIG. 1 is a flow chart illustrating the method of division used in the arithmetic system of the present invention;

FIG. 2 is a flow chart illustrating a variation of the Newton-Raphson estimation technique used to determine the short reciprocal of the divisor to be used in the division system of the present invention;

FIG. 4 is an example of the division method of the present invention using decimal numerals and a large radix of 100.

DETAILED DESCRIPTION OF THE INVENTION

Figure 3:
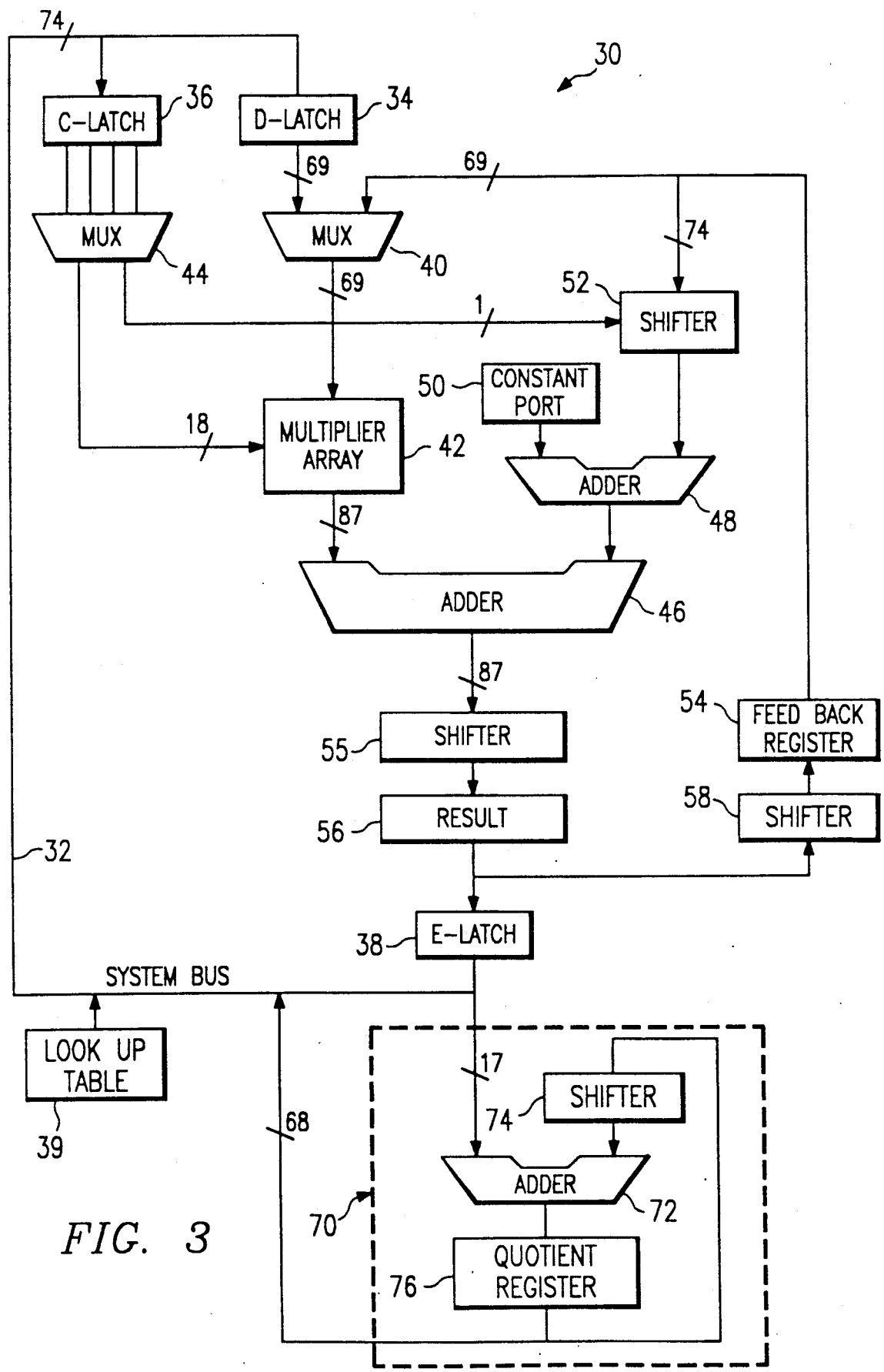
FIG. 3 is a block diagram of the arithmetic system of the present invention.

The arithmetic unit of the present invention utilizes a novel method for performing the division function. This method is shown in flow chart form in FIG. 1. The method illustrated is specially suited to operate in an arithmetic unit which comprises a rectangular aspect ratio multiplier. The arithmetic unit of the present invention may comprise, for example, a rectangular multiplier having an aspect ratio of $19 \times 69$ bits. This multiplier may be used to perform exact division of 68 bit numbers by generating four 17-bit quotient digits. The desired exact division result comprising a full precision 68 bit quotient with positive remainder is viewed in the method of the present invention as composed of four 17-bit digits employing the large radix $2^{17}$.

The method shown in FIG. 1 is used to divide a dividend x by a divisor y. The division takes place by approximating a reciprocal of the divisor to a precision less than the precision of the divisor to obtain a short reciprocal R. Quotient digit values, $g_i$, are serially determined and accumulated to generate partial quotient [Q] and finally a full precision quotient. Partial remainders are generated and stored in a register z. The final results of the exact division operation of a full precision dividend by a full precision divisor will be referred to hereinafter as a full precision quotient and remainder pair while successive values of the accumulated quotient digits stored in the Q register as they are calculated successively in the method of the present invention will be referred to as partial quotients having corresponding partial remainders, the partial remainder of a partial quotient being mathematically the same as the partial remainder associated with the last accumulated quotient digit. The method will be described with reference to a rectangular multiplier having an aspect ratio of $19 \times 69$ bits. It should be understood, however, that the division method of the present invention is applicable to a wide range of rectangular aspect ratio multipliers. The particular rectangular multiplier described herein is an embodiment chosen for the purposes of teaching the present invention, and should not be construed to limit the scope of the present invention.

Referring to FIG. 1, the method begins at step 10 wherein the partial remainder register z is loaded with the value of the dividend x. It should be understood that the method presupposes that the dividend is a 68 bit number normalized to be less than one. Therefore, the most significant bit of the partial remainder register z is equal to 0. The method then proceeds to step 12 where the short reciprocal R of the divisor is determined to (N+k) bits of accuracy. N is determined to be the number of bits in the large radix associated with the quotient digits. Here N=17, and k is a limited number of guard bits, for example, k here equals 2. According to the present embodiment, the short reciprocal R approximates the exact reciprocal to nineteen bits of accuracy. The approximation step 12 uses a variation of the Newton-Raphson approximation technique which will be described more fully with reference to FIG. 2.

A first quotient digit value is calculated in step 14 by multiplying the partial remainder register z by the short reciprocal R, generating a product 88 bits wide which is truncated to form a single 17-bit quotient digit value. The term digit is used herein with reference to the large radix $2^{17}$ and may have any positive or negative integer value having a magnitude of $2^{17}-1$ or less. In the case of a rectangular aspect ratio of $19 \times 69$ bits, four quotient digit values are required for the full precision 68-bit quotient of two 68-bit numbers. Thus, four passes through the multiplier will be required to generate the four quotient digit values.

The method proceeds to step 16 where the quotient digit value generated is accumulated. In this manner, as each quotient digit value is determined, the partial quotient Q is accumulated to 17 more bits of precision and stored.

In step 18, the partial remainder register z is updated for the calculation of the next quotient digit value. The new z register value is equal to the difference between the initial partial remainder and the product of the preceding quotient digit value and the divisor. The method then returns to step 14 where the next quotient digit value is generated by taking the product of the new partial remainder and the short reciprocal. In this manner, the quotient digit values are generated in series along with intermediate partial remainders. At the end of the process, a remainder associated with the full precision quotient is available for further processing. Although the full precision quotient and remainder pair is not unique at this point due to the fact that the remainder may be either positive or negative, precise rounding can be performed at this point by suitable conditional rounding logic. According to the embodiment disclosed herein, a correction step is performed to obviate the need for conditional rounding logic.

Using the $19 \times 69$ bit rectangular multiplier of one embodiment of the present invention, the division process requires the generation of four quotient digit values to determine a full precision quotient. Each quotient digit requires a multiplication step and a combined multiplication and subtraction step corresponding to step 14 and step 18, respectively.

An important technical advantage of the rectangular multiplier of the present invention, which will be discussed in more detail with reference to FIG. 3, is that the multiplier also comprises an additional adder port. The additional adder port makes it possible to perform a $17 \times 69$ bit multiplication step and an addition step in one pass through the rectangular multiplier. Accordingly, the operation shown in step 18, which comprises a $17 \times 69$ bit product and a difference, can be accomplished in a single pass through the rectangular multiplier.

The quotient remainder pair may be made unique by passing the quotient and the remainder through a correction sequence illustrated by step 20 in FIG. 1. Because of steps taken in the determination of the short reciprocal in step 12, the correction sequence itself is fairly simple. If the remainder is negative, the full precision quotient is decremented by one unit in the last place, and the remainder is recalculated. The recalculation of the remainder comprises adding the appropriately shifted divisor to the remainder. This simple correction sequence is possible because short the reciprocal generated in step 12 is generated in a manner such that the short reciprocal, when multiplied by the partial remainder, will generate quotient digit values which are always at most one unit greater than or exactly equal to an infinitely precise value of the quotient truncated to a predetermined number of bits. The infinitely precise quotient value is intended herein to refer to the value of the quotient in the limit in the sense of an infinite binary sequence of bits where the associated remainder is zero. Because the approximation is carefully limited to these two possible results, exact division is carried out since the resulting full precision quotient and remainder of any division operation is such that the simple correction sequence described above yields a unique full precision quotient with positive remainder. Note, that it is a convenience of this teaching to assume that the remainder must be corrected to a positive value to produce a unique quotient. A unique quotient may also be produced by consistently forcing a negative remainder. Either unique quotient remainder pair may be considered the result of exact division.

A novel version of the Newton-Raphson estimation technique used to calculate the aforementioned short reciprocal value is shown in flow chart form in FIG. 2. It should be understood that the method presupposes that the divisor is normalized into typical floating point format such that the divisor y is greater than or equal to one and less than two. The method begins at step 22, where a look-up table is used to find a reciprocal seed value y'. It should be understood that the method presupposes that the reciprocal seed value y' is normalized into typical floating point format such that y' is greater than or equal to one-half and less than one. As discussed previously, the look-up table can only achieve a small number of bits due to the limits in the size of the table. y' is thus used as a seed value and the number of accurate bits in the approximation is increased through an iterative process. In the present embodiment, the seed value, y', is chosen to be of sufficient accuracy to produce in succeeding steps an approximate reciprocal with error less than $2^{-22}$ before addition of a reciprocal bias adjustment factor.

The method proceeds to step 24 where the first step of the iterative process is used to compute y" which is equal to the product of y' and the difference of two and the product of y and y'. The method then proceeds to step 26 where the computation of an approximate reciprocal value, y''', is similarly calculated through an additional iteration of the Newton-Raphson approximation equation as shown. It should be understood that y' or y" could be used as the approximate reciprocal value if a different size multiplier were used in a different embodiment of the present invention requiring a smaller number of accurate bits in the short reciprocal R. The method concludes at step 28 where the final value of the short reciprocal is achieved by adding the value of the approximate reciprocal value, y''', to a reciprocal bias adjustment factor, epsilon, and appropriately truncating the result. Epsilon is a statically generated quantity dependent upon the digit size of the multiplier array. Epsilon is equal to the sum of two terms. The first term is equal to $2^{-(N+k)}$ where, as discussed previously N is equal to the number of bits of the radix of the quotient digit values and k is a predetermined number of guard bits. The second term may be any value less than the first term and greater than the error in the approximate reciprocal. For an embodiment of the present invention using a multiplier array having an aspect ratio of 19×69 bits, epsilon is equal to $2^{-19}+2^{-22}$. The short reciprocal R can then be used in the method illustrated in FIG. 1 to yield a full precision quotient and remainder pair which is capable of yielding a unique exact result through the simple correction technique discussed above with reference to step 20 of FIG. 1.

Each iteration of the Newton-Raphson equation may require only two passes through a rectangular aspect ratio multiplier if the multiplier includes an additional adder port. As discussed previously, because of the inclusion of an additional adder port, the (2−yy') term may be calculated in a single pass through the rectangular multiplier.

It should be understood that the method of division of the present invention does not depend upon the particular method used to calculate the short reciprocal R. The above described variation on the Newton-Raphson process is merely one possible method of generating this value. For example, a version of the Newton-Raphson approximation technique using a single iteration or more than two iterations to generate the approximate reciprocal value would be appropriate in a system using a multiplier which required a short reciprocal having less or more bits of accuracy, respectively, than the embodiment described herein. Further, if an embodiment of the present invention required an even smaller number of accurate bits in the short reciprocal, a direct table look-up of either the approximate reciprocal value prior to the addition of the reciprocal bias adjustment factor or a direct table look-up of the short reciprocal already containing the bias adjustment factor would be practical. The method described with reference to FIG. 2 is described for the purpose of teaching the present invention and should not be construed to limit the scope of the invention to this or any particular method of generating the short reciprocal R.

FIG. 3 is a block diagram of one circuit embodiment capable of preforming the method of division of the present invention. Referring to FIG. 3, a circuit, indicated generally at 30, uses a system bus 32 for communication between a microprocessor [not shown] and an arithmetic coprocessor comprising circuit 30. System bus 32 may include, for example, the data lines, address lines and control lines from the microprocessor. Coupled to the system bus 32 are a D latch 34, a C latch 36 and an E latch 38. A look-up table circuit 39 is also coupled to system bus 32 and functions to supply the reciprocal seed values for the calculation of the short reciprocal as described previously with reference to FIG. 2. Generally, the D and C latches 34 and 36 store the operands to be used in an arithmetic operation and the E latch 38 serves to store the output of the operation.

The D latch is coupled through a first multiplexer 40 to a rectangular aspect ratio multiplier array 42. The C latch 36 is coupled to the multiplier array 42 through a second multiplexer 44. The C latch 36 is coupled to the short side of the multiplier array 42 while the D latch 34 is coupled to the long side of the multiplier array 42. The short side of the multiplier array 42 comprises 18 bits and the long side of the multiplier array 42 comprises 69 bits.

Multiplier array 42 comprises a series connection of parallel adder arrays. The output of the multiplier array is 87 bits wide and forms one input into a first adder 46. The second port of first adder 46 serves as the additional adder port of the multiplier which was described previously. The second port of first adder 46 is coupled to the output of a second adder 48 which has at its inputs a constant part 50 and the output of the feedback register 54. Sixty-nine bits of the output of the feedback register 54 are also coupled to a second input port of the first multiplexer 40, thereby permitting an $18 \times 69$ bit product of feedback register 54 with second multiplexer 44 to be conditionally summed again with the contents of feedback register 54 which is passed through shifter 52 yielding a $19 \times 69$ bit total product at the output of first adder 46.

When the divisor is equal to or near 1.0, the short reciprocal will be equal to or slightly greater than one. This causes the 19 bit short reciprocal to overflow leaving a 0 in the most significant bit position. This condition is detected by examining the most significant bit, and cause shifter 52 to shift left by one which has the effect of adding in twice the contents of the feedback register 54.

An important technical advantage of the adder 46 is its ability to detect overflow and saturate the resulting sum. During the computation of the quotient digit values, the product of a short reciprocal and a partial remainder could create overflow. Therefore, the saturation feature of adder 46 is operable to provide a maximum sum corresponding to a 1 on all output bits of the adder 46.

The output of the first adder 46 is coupled to the input of a first shifter 55. First shifter 55 operates to shift the output of first adder 46 to the right or left by one place. This shifting is used to keep the maximum number of significant data bits flowing in the data path. For example, products involving the reciprocal of the divisor as an operand will automatically contain a leading zero due to the normalization of the divisor. This leading zero can be shifted off initially and later shifted back to allow for an additional significant bit to remain in the data path.

The output of first shifter 55 is input into a result register 56. The output of the result register 56 is fed into two separate locations. The output is first fed into a second shifter 58 which is coupled between the result register 56 and the input to the feedback register 54. Shifter 58 is used to shift values in the data path to the left by 17 bits. Shifter 58 is used to once again maintain as many significant data bits as possible in the data path by shifting out bits whose value is known. Because of the features of the method of the present invention, the initial 17 bits of the result of the subtraction step generating the succeeding partial remainder are always 0. This is due to the fact that the initial digits of the oprands of this substraction step always cancel. These 0 bits are therefore shifted out to the left to allow for 17 additional significant data bits to remain in the data path.

The output of the result register 56 is input into the E latch 38 which, as described previously, is coupled to the system bus 32. The system bus 32 is also coupled to an accumulator circuit, indicated generally at 70. Accumulator 70 comprises an adder 72 which has one of its ports coupled to the system bus 32. The remaining port of adder 72 is coupled to a shifter 74. The output of adder 72 is input into a quotient register 76 which is also coupled to the input of shifter 74.

As described previously, the basic operation used to perform the novel division alogorithm of the present invention is the multiplication operation. It is important to distinguish between different types of multiplication operations, however. Prior art methods of performing division calculated a full length, full precision approximation of the reciprocal of the divisor and then performed a full precision, "long-by-long" multiplication. An additional full precision multiplication was then used to correct the result.

The division method of the present invention does not require any full precision multiplications. The multiplication operations necessary for the present method are much simpler and quicker "short-by-long" rectangular multiplications. In order to complete a single short-by-long multiplication using the arithmetic circuit 30, the multiplicand is loaded into the D latch 34, and the multiplier is loaded into the C latch 36. The multiplier comprises the "short" operand comprising 18 bits which is input into the short side of the rectangular multiplier array 42. The multiplicand comprises the "long" operand comprising 69 bits which constitutes a full precision operand which is input into the long side of the rectangular multiplier array 42. The multiplicand passes through first multiplexer 40 an is input into the multiplier array 42. The 18 bits of the multiplier are input from the second multiplexer 44 into the short side of the multiplier array 42. The product of the multiplier and of the multiplicand comprises a product 87 bits long. This product is passed unchanged through the first adder 46 and the second shifter 55 to the result register 56. The product is then input into the E latch 38. Alternatively, the product may be returned to the multiplier array 42 or adders 48 or 46 for other computations by passing through shifter 58 to feedback register 54.

As stated previously, the method of division of the present invention does not involve any full precision multiplication operations. Generally, the method of division begins with the approximation of the reciprocal of the divisor and the digits of the quotient are serially generated by multiplying the approximation of the reciprocal by the current partial remainder. An understanding of the method of the division of the present invention is more easily acquired if the division operation is examined using an example using decimal numerals.

FIG. 4 illustrates an example of the method of division of the present invention as it is used to divide 0.3657483750 by 0.784731. As discussed previously, the method of the present invention involves large radix division. The large radix of the illustrated example in FIG. 4 is 100. Thus, the decimal numerals of the operands have been grouped in groups of two. Each group of two decimal numerals comprises a "digit" of the large radix 100. This is important as the quotient digit values will be generated and accumulated one large radix 100 digit at a time.

The method of the present invention begins by calculating a truncated and biased approximate reciprocal of the divisor, 0.784731. The short reciprocal is shown to be equal to 1.28. The actual value of the reciprocal of 0.784731 is equal to 1.2743 . . . The short reciprocal value used is slightly larger than the actual value of the reciprocal. The choice of 1.28 as the short reciprocal corresponds to the addition of the reciprocal bias adjustment factor followed by truncation shown in step 28 of FIG. 2. The biased value of the reciprocal must be either exactly the value of the reciprocal or slightly larger. This must be true to insure that the quotient digit values are always equal to or greater by one unit in the last place than the exact values of the quotient digits. As long as the quotient digit value is larger than the actual value of the digit, and any error is less than one unit in the last place of the digit, any error in the digit value can be offset by having the succeeding digit calculated be negative. Because of these features, the error involved in the method of the present invention is strictly controlled as is ullustrated in the example shown in FIG. 4.

Referring to FIG. 4, initially, the short reciprocal 1.28 is multiplied times the dividend 0.3657483750 to yield 0.46815792. This value is truncated to generate the first quotient digit value, 046. In the next step, the first quotient digit value, 0.46, is multiplied times the divisor, 0.784731, to yield 0.36097626. This product is subtracted from the dividend, which functions as the original partial remainder, to yield the next partial remainder, 0.47721150.

It is important to recognize that in the subtraction step used to generate the next partial remainder, the most significant digits of the operands of the subtraction operation cancel out. This fact is indicative of the earlier stated feature of this method that the error in the truncated quotient digit value is less than one unit in the last place of the quotient digit. If the error was larger than one unit in the last place, the initial digits would not necessarily cancel in the subtraction operation.

In the next step, the short reciprocal, 1.28, is multiplied times the current partial remainder, 0.47721150, to yield. 0.61083072. This product is truncated to yield the next quotient digit value 0.61. 0.61 is then multiplied times the divisor, 0.784731, to yield 0.47868591. This number is then subtracted from the partial remainder to yield −0.14744100. The negative partial remainder indicates that the prior quotient digit value was too large. However, because the partial remainder is negative, the multiplication of the partial remainder and the short reciprocal in the next step yields a negative quotient digit value. The negative quotient digit value then implicitly corrects the prior quotient digit value. Accordingly, the partial remainder, −0.14744100, is multiplied times the short reciprocal, 1.28, to yield −018872448. This number is truncated to yield the next quotient digit value, −0.18.

The method continues for the generation of two more quotient digit values, −0.79 and 0.12. The method can be terminated after generating any number of quotient digit values and an exact remainder will be available, or the method can be continued indefinitely.

The method illustrated by the large radix 100 example shown in FIG. 4 is directly appliable to the circuit shown in FIG. 3, the only difference being the circuit shown in FIG. 3 utilizes operands in binary signed digit format. Further, the length of the quotient digits generated by the circuit shown in FIG. 3 is seventeen bits. This corresponds to a large radix of $2^{17}=131,072$.

In order to perform the division method of the present invention using circuit 30, the short reciprocal is generated as described previously and stored in a portion of C latch 36. The dividend is loaded into the feedback register 54 by passing it unchanged from the system bus 32 through circuit 30. The divisor is loaded into the D latch 34.

In order to generate the first quotient digit value, the dividend is multiplied by the short reciprocal in the multiplier array 42. The seventeen most significant bits of the product of this multiply constitute the first quotient digit value. The first quotient digit value is then loaded into a remaining portion C latch 36. The quotient digit value is also loaded through adder 72 into quotient register 76.

The first partial remainder is calculated by multiplying the divisor stored in the D latch 34 times the first quotient digit value stored in the C latch 36 and subtracting this exact amount from the dividend which is stored in the feedback register 54. The dividend is fed to second adder 48, and is passed to first adder 46 where the product of the divisor and the first quotient digit value is subtracted. The first partial remainder is shifted to the left seventeen bits in third shifter 58. As described previously, the first seventeen bits of the partial remainder are all zero resulting from the fact that the initial digits of the operands of the subtraction operation cancel out as was discussed with reference to FIG. 4. The shifted partial remainder is then loaded into feedback register 54. The circuit is then ready to generate the next quotient digit value in the same manner as discussed above substituting each sucessive partial remainder for the dividend in the above discussion. Each succeeding quotient digit value is accumulated by adding it to the preceding partial quotient in adder 72 and loading the new resulting partial quotient in quotient register 76. The preceding pratial quotient is appropriately shifted to the left by 17 bits by shifter 74 before it is added to each succeeding quotient digit value.

These steps are repeated until four quotient digit values have been accomulated and an exact remainder is available. The circuit then performs a correction sequence based on the value of the final partial remainder. If the final partial remainder is negative, the accumulated quotient is decremented by one unit in the last place, and the appropriately shifted divisor is added to the final partial remainder. The final full precision quotient is available from the quotient register 76 through the system bus 32.

In summary, the present invention provides a method of performing exact division which comprises approximating the reciprocal of the divisor and serially generating large radix quotient digit values and exact remainders. A reciprocal bias adjustment factor is added to the approximation of the reciprocal to insure that any error within a particular quotient digit value will be limited to one unit in the last place of the truncated digit. This is to ensure that the error in the digit can be compensated for in the calculation of the remaining digit values. The particular circuit embodiment described herein uses a rectangular multiplier which includes an additional adder port. The rectangular multiplier of this circuit is particularly suited to the division operation of the present invention as the short side of the multiplier array comprises substantially the same number of bits as a single quotient digit value.

Although the invention has been described in connection with the particular circuit embodiment, it should be understood that the method of division of the present invention is equally applicable to a large number of multipliers with widely varying aspect ratios using either non-redundant or signed digit format as well as circuits which do not utilize an array multiplier. The disclosure of the particular circuit described herein is for the purposes of teaching the present invention and should not be construed to limit the scope of the present invention which is solely defined by the scope and spirit of the appended claims.

What is claimed is:

1. A circuit for performing exact division of a dividend by a divisor, comprising:
    a rectangular array multiplier;
    circuitry associated with said multiplier for obtaining a short reciprocal of said divisor;
    circuitry associated with said multiplier for facilitating the multiplication of said short reciprocal by said dividend to yield a first product;
    circuitry associated with said multiplier for truncating said first product to have less bits than said divisor to yield a first quotient digit value;
    circuitry associated with said multiplier for facilitating the generation of a product of said first quotient digit value and said divisor;
    circuitry associated with said multiplier for computing the difference between said dividend and said product of said first quotient digit value and said divisor to yield a first partial remainder;
    circuitry associated with said multiplier for facilitating the multiplication of said short reciprocal by said first partial remainder to yield a subsequent product;
    circuitry associated with said multiplier for truncating said subsequent product to have less bits than said divisor to yield a subsequent quotient digit value;
    circuitry associated with said multiplier for facilitating the generation of a product of said subsequent quotient digit value and said divisor; and
    circuitry associated with said multiplier for computing the difference between said first partial remainder and said product of said subsequent quotient digit value and said divisor to yield a new partial remainder, said first quotient digit value and said subsequent quotient digit value calculated such that said partial remainder and said new partial remainder have magnitudes corresponding to less than one unit in the last place of said first quotient digit value and said subsequent quotient digit value, respectively.

2. The circuit of claim 1 and further comprising:
    circuitry associated with said multiplier for generating a desired number of quotient digit values by reiterating said computations using a new partial remainder to generate each new quotient digit value, all of said quotient digit values calculated such that subsequent partial remainders have magnitudes corresponding to less than one unit in the last place of a preceding quotient digit value.

3. The circuit of claim 1 and further comprising:
    circuitry associated with said multiplier for storing said short reciprocal.

4. The circuit of claim 1 wherein said circuitry for obtaining a short reciprocal comprises:
    circuitry for adding a reciprocal bias adjustment factor to an approximate reciprocal of said divisor to yield a sum and truncating said sum to yield said short reciprocal, said reciprocal bias adjustment factor chosen to offset accumulated error in said approximate reciprocal and bias said short reciprocal to produce quotient digit values which, when accumulated to form a partial quotient, are always at most one unit in the last place greater than or exactly equal to an infinitely precise value of the quotient truncated to a predetermined number of bits.

5. The circuit of claim 4 wherein said quotient digit values give rise to a negative partial remainder when said quotient digit values are greater than said exact value, said negative partial remainder causing a succeeding quotient digit value to be negative, thereby causing a product of said succeeding quotient digit value and the divisor operable to reduce the magnitude of said negative partial remainder and, when combined with a preceding quotient digit value, producing a borrowing from the least significant bit of said preceding quotient digit value.

6. The circuit of claim 4 wherein said circuitry for obtaining a short reciprocal of said divisor further comprises:
    circuitry associated with said multiplier for computing a final reciprocal approximation equal to the sum of a prior reciprocal approximation and a reciprocal bias adjustment factor chosen to offset accumulated error in said prior reciprocal approximation and bias said final reciprocal approximation to produce quotient digit values which, when accumulated to form a partial quotient, are always at most one unit in the last place greater than or exactly equal to an infinitely precise value of the quotient truncated to a predetermined number of bits.

7. The circuit of claim 6 wherein said prior reciprocal approximation is equal to said second reciprocal approximation.

8. The circuit of claim 6 wherein said reciprocal bias adjustment factor is equal to the sum of a first and a second term, said first term equal to $2^{-(N+k)}$ where N is equal to the number of bits of the radix of the quotient digit values and k is a predetermined number of guard bits, said second term being less than said first term.

9. The circuit of claim 6 wherein said reciprocal bias adjustment factor is equal to the sum of $2^{-19}$ and $2^{-22}$.

10. The circuit of claim 1 wherein said circuitry for obtaining a short reciprocal of said divisor, comprises:
    look-up table circuitry for storing a plurality of reciprocal seed values;
    retrieval circuitry coupled to said look-up table circuitry for retrieving a particular reciprocal seed value associated with said divisor;
    circuitry associated with said multiplier and said retrieval circuitry for computing a first term comprising the difference between two and the product of said divisor and said particular reciprocal seed value and for computing a product of said first term and said particular reciprocal seed value to yield a first reciprocal approximation; and
    circuitry associated with said multiplier for computing a second term comprising the difference between two and the product of said divisor and said first reciprocal approximation and for computing a product of said second term and said first reciprocal approximation to yield a second reciprocal approximation.

11. The circuit of claim 1 and further comprising:
    circuitry associated with said multiplier for decrementing a final quotient digit value generated by one unit in the last place if a final partial remainder generated is negative.

12. The circuit of claim 11 and further comprising:

circuitry associated with said multiplier for correcting said final partial remainder by adding said divisor to said final partial remainder if said final partial remainder is negative.

13. The circuit of claim 1 wherein said circuitry for obtaining a short reciprocal comprises:
    look-up for table circuitry for storing a plurality of approximate reciprocal values;
    retrieval circuitry coupled to said look-up table circuitry for retrieving a particular approximate reciprocal value associated with said divisor.

14. The circuit of claim 13 wherein said circuitry for obtaining a short reciprocal further comprises:
    circuitry for adding a reciprocal bias adjustment factor to said particular approximate reciprocal value to yield a sum and truncating said sum to yield said short reciprocal, said reciprocal bias adjustment bias adjustment factor chosen to offset error in said particular approximate reciprocal value and bias said short reciprocal to produce quotient digit values which, when accumulated to form a partial quotient, are always at most one unit in the last place greater than or exactly equal to an infinitely precise value of the quotient truncated to a predetermined number of bits.

15. The circuit of claim 14 wherein said reciprocal bias adjustment factor is equal to the sum of a first and a second term, said first term equal to $2^{-(N+k)}$ where N is equal to the number of bits of the radix of the quotient digit values and k is a predetermined number of guard bits, said second term being less than said first term.

16. The circuit of claim 14 wherein said reciprocal bias adjustment factor is equal to the sum of $2^{-19}$ and $2^{-22}$.

17. The circuit of claim 1 wherein said circuitry for obtaining a short reciprocal comprises:
    look-up table circuitry for storing a plurality of short reciprocal values, each of said short reciprocal values comprising the truncated sum of an approximate reciprocal value and a reciprocal bias adjustment factor chosen to offset error in said approximate reciprocal value and bias said short reciprocal value to produce quotient digit values which, when accumulated to form a partial quotient, are always at most one unit in the last place greater than or exactly equal to an infinitely precise value of the quotient truncated to a predetermined number of bits; and
    retrieval circuitry coupled to said look-up table circuitry for retrieving a particular approximate reciprocal value associated with said divisor.

18. The circuit of claim 17 wherein said reciprocal bias adjustment factor is equal to the sum of a first and a second term, said first term equal to $2^{-(N+k)}$ where N is equal to the number of bits of the radix of the quotient digit values and k is a predetermined number of guard bits, said second term being less than said first term.

19. The circuit of claim 17 wherein said reciprocal bias adjustment factor is equal to the sum of $2^{-19}$ and $2^{-22}$.

20. The circuit of claim 1 wherein said circuitry for obtaining a short reciprocal comprises:
    look-up table circuitry for storing a plurality of reciprocal seed values;
    retrieval circuitry for retrieving a particular reciprocal seed value associated with said divisor;
    circuitry associated with said retrieval circuitry for computing a first term comprising the difference between two and the product of said divisor and said particular reciprocal seed value and for computing a product of said first term and said particular reciprocal seed value to yield an approximate reciprocal value.

21. The circuit of claim 20 wherein said circuitry for obtaining a short reciprocal further comprises:
    circuitry for adding a reciprocal bias adjustment factor to said approximate reciprocal value to yield a sum and truncating said sum to yield said short reciprocal, said reciprocal bias adjustment factor chosen to offset error in said approximate reciprocal to product quotient digit values which, when accumulated to form a partial quotient, are always at most one unit in the last place greater than or exactly equal to an infinitely precise value of the quotient truncated to a predetermined number of bits.

22. The circuit of claim 21 wherein said reciprocal bias adjustment factor is equal to the sum of a first and a second term, said first term equal to $2^{-(N+k)}$ where N is equal to the number of bits of the radix of the quotient digit values and k is a predetermined number of guard bits, said second term being less than said first term.

23. The circuit of claim 21 wherein said reciprocal bias adjustment factor is equal to the sum of $2^{-19}$ and $2^{-22}$.

24. The circuit of claim 1 wherein said circuitry for obtaining a short reciprocal comprises:
    circuitry for obtaining an approximate reciprocal value associated with said divisor; and
    circuitry for adding a reciprocal bias adjustment factor to said approximate reciprocal value to yield a sum and truncating said sum to yield said short reciprocal, said reciprocal bias adjustment factor chosen to offset error in said approximate reciprocal value and bias said short reciprocal to produce quotient digit values which, when accumulated to form a partial quotient, are always at most one unit in the last place greater than or exactly equal to an infinitely precise value of the quotient truncated to a predetermined number of bits.

25. The circuit of claim 24 wherein said reciprocal bias adjustment factor is equal to the sum of a first and a second term, said first term equal to $2^{-(N+k)}$ where N is equal to the number of bits of the radix of the quotient digit values and k is a predetermined number of guard bits, said second term being less than said first term.

26. The circuit of claim 24 wherein said reciprocal bias adjustment factor is equal to the sum of $2^{-19}$ and $2^{-22}$.

* * * * *

UNITED STATES PATENT AND TRADEMARK OFFICE
CERTIFICATE OF CORRECTION

PATENT NO. : 5,046,038

DATED : September 3, 1991

INVENTOR(S) : Willard B. Briggs et al.

It is certified that error appears in the above-identified patent and that said Letters Patent is hereby corrected as shown below:

On the Title Page, item [56]:

Under "References Cited", "U.S. PATENT DOCUMENTS", between Amdahl et al. and Iannucci et al., insert -- 4,338,675      7/82      Palmer et al.      364/748 --.

On the first page, under "References Cited", insert section entitled
-- OTHER PUBLICATIONS Atkins, "Higher-Radix Division Using Estimates of the Divisor and Partial Remainders", Oct. 1968 IEEE, Vol. C-17, No. 10, pp. 925-934.

Bose et al., "Fast Multiply and Divide for a VLSI Floating-Point Unit", CH2419-0, 1987 IEEE, Dept. of Elect. Eng. & Comp. Sci., U. of CA.-Berkeley, pp. 87-94.

Coonen, "Specifications for a Proposed Standard for Floating-Point Arithmetic", Memo No. UCB/ERLM78/72, Oct. 1978, Elect. Rsrch. Lab., U. of CA.-Berkeley.

Ercegovac et al., "A Division Algorithm with Prediction of Quotient Digits", 1985 IEEE, Comp. Sci. Dept., U. of CA.-L.A.,pp. 51-56.

UNITED STATES PATENT AND TRADEMARK OFFICE
CERTIFICATE OF CORRECTION

PATENT NO. : 5,046,038

DATED : September 3, 1991

INVENTOR(S) : Willard B. Briggs et al.

It is certified that error appears in the above-indentified patent and that said Letters Patent is hereby corrected as shown below:

Fandrianto, J.,"Algorithm for High Speed Shared Radix 4 Division and Radix 4 Square-Root", 1987 IEEE, pp. 73-79.

Ferrari, D., "A Division Method Using a Parallel Multiplier", Apr. 1967 IEEE, pp. 224-226.

Flynn, M. J., "On Division by Functional Iteration", Aug. 1970 IEEE, Vol. C-19, No. 8, pp. 702-706.

"IEEE Standard for Binary Floating-Point Arithmetic", ANSI/IEEE Std 754-1985, Inst.of Electrical & Electronics Eng., Inc., N.Y., N.Y.

Parikh, S., "An Architecture for a Rational Arithmetic Unit", Oct. 1988, U. of Texas/Arlington Dissertation in Dept. of Comp. Sci. & Eng.

Svoboda, A., "An Algorithm for Division", 1963, Inf. Process. Mach. 9:25-32.

Taylor, G. S., "Compatible Hardware for Division and Square Root", 1981 IEEE, Comp. Sci. Div., U. of CA.-Berkeley, pp. 127-134.

Column 9, line 50, delete "-018872448" and insert -- -.018872448 --.

Column 10, line 68, after "utilize" delete "an array" and insert -- a rectangular --.

UNITED STATES PATENT AND TRADEMARK OFFICE
CERTIFICATE OF CORRECTION

PATENT NO. : 5,046,038
DATED : September 3, 1991
INVENTOR(S) : Willard B. Briggs et al.

It is certified that error appears in the above-indentified patent and that said Letters Patent is hereby corrected as shown below:

Claim 13, Column 13, line 7, after "look-up" delete "for".

Claim 14, column 13, line 18, delete "bias adjustment".

Signed and Sealed this

Thirteenth Day of September, 1994

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,046,038
DATED : September 3, 1991
INVENTOR(S) : Briggs, et al

It is certified that error appears in the above-indentified patent and that said Letters Patent is hereby corrected as shown below:

Column 3, line 40, delete "$g_i$" and insert --$q_i$--.
Column 5, line 8, delete "short the" and insert --the short --.
Column 7, line 24, delete "cause" and insert --causes --.
          line 59, delete "oprands" and insert --operand --.
Column 8, line 5, delete "alogorithm" and insert --algorithm --.

Column 9, line 19, delete "046" and insert -- 0.46 --.

Column 10, line 8, after "portion" insert --of --.
          line 32, delete "pratial" and insert --partial --and
          line 36, delete "accomulated" and insert --accumulated --.

UNITED STATES PATENT AND TRADEMARK OFFICE
CERTIFICATE OF CORRECTION

PATENT NO. : 5,046,038
DATED : September 3, 1991
INVENTOR(S) : Briggs, et al

It is certified that error appears in the above-indentified patent and that said Letters Patent is hereby corrected as shown below:

Column 3, line 41, delete "quotient" and insert --quotients --

Column 4, line 66, after "quotient" insert --and --.

Column 5, line 12, after "unit" insert --in the last place --.

Column 7, line 58, delete "digits" and insert --bits --.

Column 8, line 11, after "multiplication" and insert --to obtain the approximate quotient --.

line 47, delete the second occurrence of "the"

Column 9, line 12, delete "negative" and insert --of opposite sign --.
       line 27, delete "digits" and insert --bits--
       line 31, delete "was" and insert --were --.
       line 50, delete "018872448" and insert --0.18872448 --.
       line 60, delete "signed digit"

Column 10, line 6, delete "multiply" and insert --multiplication --.
       line 22, delete "digits" and insert --bits --.
       line 31, delete "in' and insert --into -- and

UNITED STATES PATENT AND TRADEMARK OFFICE
CERTIFICATE OF CORRECTION

PATENT NO. : 5,046,038
DATED : September 3, 1991
INVENTOR(S) : Briggs, et al

It is certified that error appears in the above-indentified patent and that said Letters Patent is hereby corrected as shown below:

Column 14, line 21 (Claim 21) delete "product" and insert --produce --.

Signed and Sealed this

Fourteenth Day of February, 1995

Attest:

BRUCE LEHMAN

*Attesting Officer*     *Commissioner of Patents and Trademarks*